(12) United States Patent
Feder et al.

(10) Patent No.: US 10,974,139 B2
(45) Date of Patent: Apr. 13, 2021

(54) PERSISTENT PROGRESS OVER A CONNECTED DEVICE NETWORK AND INTERACTIVE AND CONTINUOUS STORYTELLING VIA DATA INPUT FROM CONNECTED DEVICES

(71) Applicant: Disney Enterprises, Inc., Burbank, CA (US)

(72) Inventors: David H. Feder, San Francisco, CA (US); Thomas M. Dekeyser, Sunnyvale, CA (US); Nina W. Chai, Sunnyvale, CA (US); Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 587 days.

(21) Appl. No.: 15/808,716

(22) Filed: Nov. 9, 2017

(65) Prior Publication Data
US 2019/0134501 A1  May 9, 2019

(51) Int. Cl.
*A63F 13/327* (2014.01)
*A61C 17/22* (2006.01)
(Continued)

(52) U.S. Cl.
CPC ........ *A63F 13/327* (2014.09); *A46B 15/0002* (2013.01); *A61C 17/22* (2013.01); *A63F 13/211* (2014.09); *A63F 13/215* (2014.09); *A63F 13/24* (2014.09); *A63F 13/285* (2014.09); *A63F 13/428* (2014.09); *A63F 13/52* (2014.09); *A63F 13/56* (2014.09); *A63F 13/65* (2014.09); *A63F 13/69* (2014.09); *A63F 13/79* (2014.09); *A63F 13/822* (2014.09); *A63F 13/85* (2014.09);
(Continued)

(58) Field of Classification Search
CPC .......... A63F 13/30; A63F 13/31; A63F 13/32; A63F 13/323; A63F 2300/40; A63F 2300/403; A63F 2300/50; A63F 2300/53; A63F 2300/552
See application file for complete search history.

(56) References Cited

U.S. PATENT DOCUMENTS 6,272,545 B1 *  8/2001  Flanagin ................ G06F 8/61
                                                           709/201
6,496,979 B1 * 12/2002  Chen ...................... G06F 8/61
                                                           717/178
(Continued)

*Primary Examiner* — Steven J Hylinski
(74) *Attorney, Agent, or Firm* — Patterson + Sheridan, LLP

(57) ABSTRACT

Systems, methods and articles of manufacture for affect a virtual world based n available electronic devices. A control node identifies electronic devices present within a physical environment. Embodiments detect a device type of a first electronic device and determine an API implemented by the first electronic device, based on the detected device type of the first electronic device. Electronic messages are transmitted to the first electronic device, via the one or more data communications networks. The electronic messages are formatted according to the determined API. One or more actions are determined for a first user for a first computer game, based on data received from the first electronic device via the one or more data communications networks, and a game state for the first computer game is updated, based on performance of the one or more actions.

20 Claims, 5 Drawing Sheets

(51) Int. Cl.

| | | |
|---|---|---|
| *G06F 9/54* | (2006.01) | |
| *A63F 13/52* | (2014.01) | |
| *A63F 13/215* | (2014.01) | |
| *A63F 13/79* | (2014.01) | |
| *A63H 3/00* | (2006.01) | |
| *A63F 13/211* | (2014.01) | |
| *A63F 13/285* | (2014.01) | |
| *A63F 13/85* | (2014.01) | |
| *A63F 13/428* | (2014.01) | |
| *A63F 13/24* | (2014.01) | |
| *A63F 13/56* | (2014.01) | |
| *A63F 13/65* | (2014.01) | |
| *A63F 13/69* | (2014.01) | |
| *A63F 13/822* | (2014.01) | |
| *G06F 16/951* | (2019.01) | |
| *A46B 15/00* | (2006.01) | |
| *A63H 3/28* | (2006.01) | |

(52) U.S. Cl.
CPC ............ *A63H 3/003* (2013.01); *A63H 3/28* (2013.01); *G06F 9/546* (2013.01); *G06F 9/547* (2013.01); *G06F 16/951* (2019.01); *A61C 2203/00* (2013.01); *A63H 2200/00* (2013.01)

(56) References Cited

U.S. PATENT DOCUMENTS

| | | | | |
|---|---|---|---|---|
| 6,542,908 | B1* | 4/2003 | Ims | G06F 8/76 |
| 6,701,521 | B1* | 3/2004 | McLlroy | G06F 8/61 |
| | | | | 717/173 |
| 7,305,254 | B2* | 12/2007 | Findikli | H04W 12/1008 |
| | | | | 455/557 |
| 7,546,298 | B2* | 6/2009 | Hulaj | G06F 9/451 |
| 7,668,937 | B2* | 2/2010 | Neil | H04L 67/04 |
| | | | | 709/219 |
| 7,761,602 | B1* | 7/2010 | Knight | H04N 21/8193 |
| | | | | 709/246 |
| 8,543,927 | B1* | 9/2013 | McKinley | H04M 1/72544 |
| | | | | 715/753 |
| 8,595,186 | B1* | 11/2013 | Mandyam | G06F 8/38 |
| | | | | 707/632 |
| 9,776,091 | B1* | 10/2017 | Lebrun | A63F 13/358 |
| 2002/0129126 | A1* | 9/2002 | Chu | G06F 8/76 |
| | | | | 709/220 |
| 2003/0033356 | A1* | 2/2003 | Tran | H04L 67/306 |
| | | | | 709/203 |
| 2005/0097199 | A1* | 5/2005 | Woodard | H04L 67/125 |
| | | | | 709/223 |
| 2005/0188066 | A1* | 8/2005 | Papanikolaou | H04L 67/04 |
| | | | | 709/223 |
| 2008/0009344 | A1* | 1/2008 | Graham | G07F 17/3244 |
| | | | | 463/25 |
| 2008/0148407 | A1* | 6/2008 | Katkar | G06F 21/566 |
| | | | | 726/24 |
| 2008/0280682 | A1* | 11/2008 | Brunner | A63F 3/00643 |
| | | | | 463/40 |
| 2009/0257416 | A1* | 10/2009 | Walker | H04W 8/20 |
| | | | | 370/338 |
| 2011/0136577 | A1* | 6/2011 | Dietz | A63F 13/335 |
| | | | | 463/43 |
| 2012/0077584 | A1* | 3/2012 | Sarmenta | A63F 13/235 |
| | | | | 463/31 |
| 2012/0159308 | A1* | 6/2012 | Tseng | G06F 40/14 |
| | | | | 715/234 |
| 2012/0191575 | A1* | 7/2012 | Vilke | G06Q 30/0641 |
| | | | | 705/27.1 |
| 2013/0045803 | A1* | 2/2013 | Kang | A63F 13/00 |
| | | | | 463/42 |
| 2013/0316832 | A1* | 11/2013 | Olofsson | G07F 17/3223 |
| | | | | 463/42 |
| 2014/0179427 | A1* | 6/2014 | Miura | A63F 13/00 |
| | | | | 463/31 |
| 2014/0227676 | A1* | 8/2014 | Noshadi | G09B 5/02 |
| | | | | 434/365 |
| 2015/0067186 | A1* | 3/2015 | Kuhn | H04L 65/607 |
| | | | | 709/231 |
| 2015/0249672 | A1* | 9/2015 | Burns | G06F 21/629 |
| | | | | 726/4 |
| 2015/0304447 | A1* | 10/2015 | Karp | G06F 16/9577 |
| | | | | 709/203 |
| 2016/0035178 | A1* | 2/2016 | Judkins | A63F 13/825 |
| | | | | 463/23 |
| 2016/0247238 | A1* | 8/2016 | Kunapuli | G06Q 40/12 |
| 2017/0187825 | A1* | 6/2017 | Metral | H04L 67/32 |
| 2017/0311008 | A1* | 10/2017 | Petersen | H04N 21/43637 |
| 2017/0339252 | A1* | 11/2017 | Hamill | H04L 67/02 |
| 2017/0374154 | A1* | 12/2017 | Hamill | H04W 4/18 |
| 2018/0109559 | A1* | 4/2018 | Kurupati | H04L 63/1425 |
| 2019/0098488 | A1* | 3/2019 | Syed | H04L 67/306 |

* cited by examiner

PERSISTENT PROGRESS OVER A CONNECTED DEVICE NETWORK AND INTERACTIVE AND CONTINUOUS STORYTELLING VIA DATA INPUT FROM CONNECTED DEVICES

BACKGROUND

Field of the Invention

The present invention generally relates to electronic device management, and more specifically to techniques for controlling electronic devices as part of a computer gaming application.

Description of the Related Art

Many modern physical locations, such as homes, contain a number of interconnected electronic devices. Such electronic devices can be referred to as Internet-of-Things devices. Generally, these devices may be capable of collecting data (e.g., describing the behavior of the device, describing conditions of the physical environment, etc.), which can then be communicated to and used by one or more other electronic devices. One challenge when integrating such devices is that they are typically produced by a variety of different manufacturers and may not conform to any standardized feature set, interface, communication protocol, and so on.

Currently, relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

SUMMARY

Embodiments described herein provide a method, system and computer-readable medium that include identifying, at a control node, a plurality of electronic devices present within a physical environment, by communicating with the plurality of electronic devices over one or more data communications networks. The method includes detecting, for a first one of the plurality of electronic devices, a respective device type of the first electronic device. The method, system and computer-readable medium include determining an Application Program Interface (API) implemented by the first electronic device, based on the detected device type of the first electronic device. Additionally, the method, system and computer-readable medium include transmitting one or more electronic messages to the first electronic device, via the one or more data communications networks. The one or more electronic messages are formatted according to the determined API implemented by the first electronic device. The method, system and computer-readable medium further include determining to perform one or more game actions for a first user within a virtual world for a first computer game, based on data received from the first electronic device, via the one or more data communications networks. The method, system and computer-readable medium include updating a game state for the first computer game, based on the determined one or more game actions.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Connected device networks are becoming more prevalent in the home, but these networks (made up of devices from a variety of companies) can lack cohesiveness. As such, consumer interaction with individual devices in the network can feel disjointed and singular, with most user-device interactions remaining self-contained (in that particular moment, and with that particular device). This can lead to a less compelling user experience, and does not effectively encourage repeat engagement with the connected device network.

Figure 1:
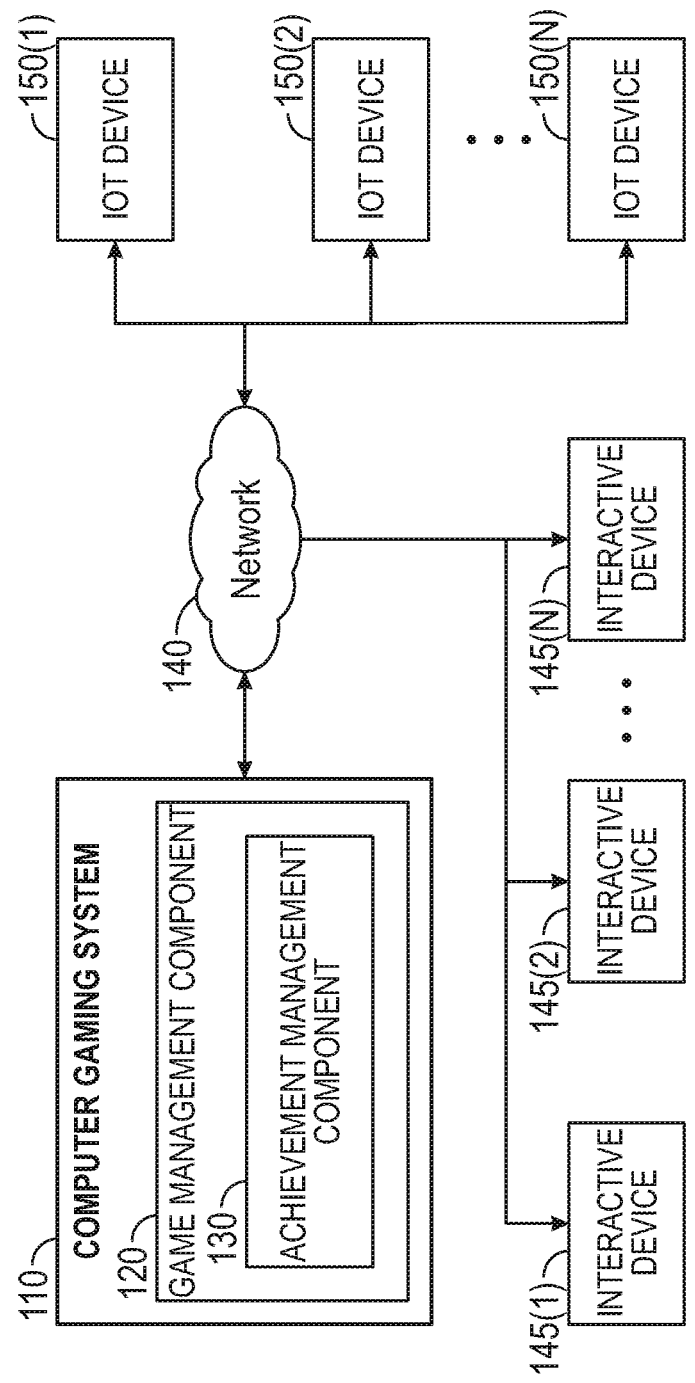
FIG. 1 is a block diagram illustrating a system configured with a game management component 120, according to one embodiment described herein.

FIG. 1 is a block diagram illustrating a system configured with a game management component, according to one embodiment described herein. As shown, the system 100 includes a computer gaming system 110, a plurality of Internet-of-Things (IOT) devices 150(1)-(N), and a plurality of interactive devices 145(1)-(N), interconnected via a network 140. For example, the network 140 could represent a WiFi network, a Bluetooth network, and so on. The computer gaming system 110 includes a game management component 120, which in turn includes an achievement management component 130. The IOT devices 150(1)-(N)

generally represent network-connected devices within a physical environment (e.g., a user's home). Examples of such devices include, without limitation, network-connected lighting devices, audio devices, alarm clocks, mirrors, door locks, toothbrushes, fans, display devices, and so on. The interactive devices 145(1)-(N) represent network-connected toy devices that can be controlled by the game management component 120. For example, each interactive device 145(1)-(N) could be an action figure toy device, configured with a respective network adapter (e.g., a Bluetooth transceiver), output devices (e.g., haptic feedback devices, illumination devices, etc.) and sensor devices (e.g., an inertial measurement unit (IMU) sensor).

Embodiments described herein can deliver interactive media experiences via existing and new network connected devices in the home, creating a continuous and cohesive narrative. Embodiments can utilize a central hub that recognizes user input from a variety of connected devices and allows for reactive and interactive media over a prolonged time period. Embodiments can recognize simultaneous user and device input and use this data to trigger delivery of branded media touchpoints.

For example, in one embodiment, the user is a young boy who is an avid fan of a particular fictional character. The user wakes up and turns off his network-connected alarm clock (e.g., IOT device 150(1)). A game management component 120 can receive data from the network connected clock and can process this data to determine a gameplay action to perform in response. For example, the game management component 120 can transmit instructions to a network-connected audio system (e.g., IOT device 150(2)) to output audio data representing dialogue, in the voice of the fictional character, to inform the user that he has been given an urgent mission for the morning to defeat a fictional evil villain. The dialogue can inform the user that he must don some armor (e.g., the clothes for the day) and prepare for a fire fight as part of the virtual game. While the user is picking out his clothes, the game management component 120 can continue outputting audio data, briefing the user on the context for the virtual mission with some backstory on the fictional villain. The dialogue can then inform the user to put on his blaster device (e.g., represented by a smartwatch). The game management component 120 can receive data from the smartwatch and can analyze this data to determine when the user has completed the assigned tasked (e.g., determining the user has performed a task by performing a pattern-matching analysis on inertial measurement unit data received from the smartwatch, determining the user has performed the task of wearing the smartwatch based on receiving heartbeat data from the smartwatch).

Additionally, the game management component 120 can transmit instructions to other electronic devices within the physical environment, such as network-connected lights (e.g., IOT device 150(3)), instructing these devices to change the lighting within the physical environment to create a more intense mood (e.g., by dimming the intensity of the lights and changing the color of the light to include more red coloration). Additionally, the game management component 120 can instruct the audio system to output different audio data (e.g., dramatic music), further changing to a more intense mood. The game management component 120 could then output audio data representing dialogue that instructed the user to hook into his propulsion system (e.g., the user's backpack) and raise his blaster device to defeat the villain. The smartwatch device can collect data (e.g., inertial measurement unit data) for transmission to the game management component 120, and the game management component 120 can analyze the data to detect the user's blast motion. The game management component 120 could then transmit instructions to the lights and audio system, causing these devices to react accordingly. For example, the dialogue in the voice of the fictional character can inform the user that the villain has been defeated and he's free to head for the schoolbus.

Figure 2:
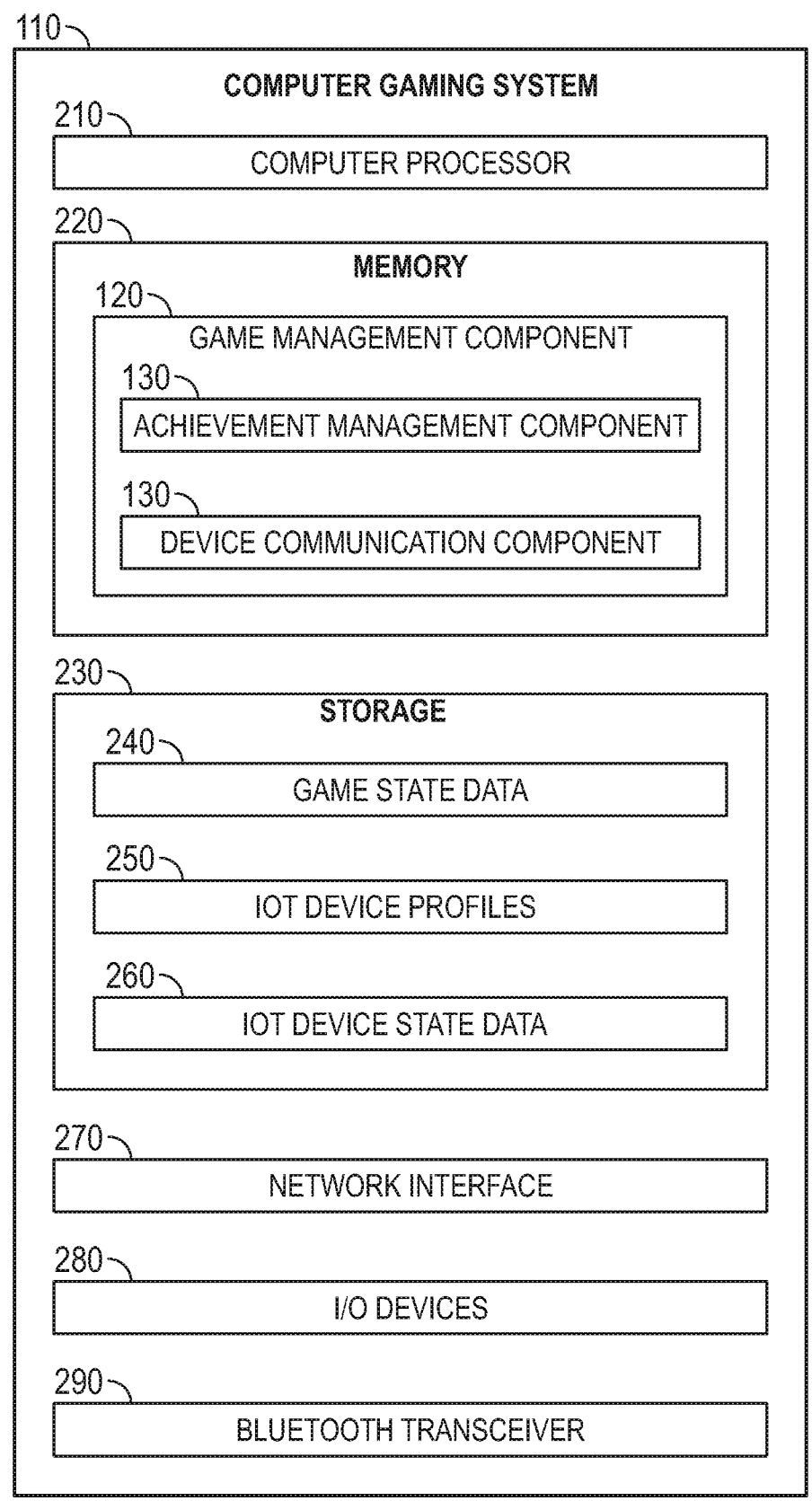
FIG. 2 is a block diagram illustrating a computer gaming system configured with a game management component 120, according to one embodiment described herein.

FIG. 2 is a block diagram illustrating a computer gaming system configured with a game management component 120, according to one embodiment described herein. As shown, the computer gaming system 110 includes a computer processor 210, a memory 220, a storage device 230, a network interface 270, Input/Output (I/O) devices 280 and a Bluetooth transceiver 290. The computer gaming system 110 can also include an I/O device interface used to connect I/O devices the I/O devices 280, e.g., keyboard, display, and mouse devices, to the computer gaming system 110. In some embodiments, the computer gaming system 110 represents a particular compute instance of a single computing device (e.g., computing components within a chassis, a blade within a blade server, an I/O drawer, a processor chip, etc.). Alternatively, the computer gaming system 110 can represent an entire computing device that includes one or more processors and one or more associated memory devices.

Each computer processor 210 retrieves and executes programming instructions stored in the memory 220 or storage 230. Similarly, the computer processor 210 stores and retrieves application data residing in the memory 220. An interconnect (not shown) can be used to transmit programming instructions and application data between each computer processor 210, the I/O device interface, storage 230, network interface 270, and memory 220. The interconnect can be one or more busses. The computer processor(s) 210 can be a single CPU, multiple CPUs, or a single CPU having multiple processing cores in various embodiments. In one embodiment, the processor 210 can be a digital signal processor (DSP).

The memory 220 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that can store non-volatile data. The network interface 115 is configured to transmit data via the communications network 140.

The computer gaming system 110 can include one or more operating systems. An operating system can be stored partially in memory 220 and partially in storage 230. Alternatively, an operating system can be stored entirely in memory 220 or entirely in storage 230. The operating system provides an interface between various hardware resources, including the computer processor 210, I/O device interface, network interface 270 and so on. In addition, an operating system provides common services for application programs, such as providing a time function.

The game management component 120 includes an achievement management component 130 and a device communication component 225. The achievement management component 130 can generally be tasked with determining when a user has satisfied one or more conditions for unlocking a predefined achievement, and upon satisfaction of the condition(s), updating game state data to unlock the predefined achievement for the user. For example, a particular achievement could require the user to brush his teeth twice per day for an entire month in order for the achievement to be unlocked. The device communication component 225 of the game management component 120 could request data from a network-connected toothbrush device describing usage data of the toothbrush by the user, and upon determining that the usage data indicates that the user has brushed his teeth for an entire month, the achievement management component 130 could unlock the predefined achievement for the user within the gaming environment. In doing so, the achievement management component 130 could reward the user with one or more rewards within the gaming environment that correspond to the predefined achievement (e.g., additional experience for the user's avatar, virtual items, unlocking new gaming content, etc.).

As another example, another user could be a young working professional who loves a particular fictional character (e.g., as indicated by user preference data). The user may wake up with a network-connected alarm clock, and a game management component 120 could instruct the alarm clock device to play themed wake-up music corresponding to the user's preferred fictional character. The device communication component 225 could collect data from the alarm clock describing how many the user depressed the snooze button on the clock, and the game management component 120 could determine to perform an action based on this data and the user's position (e.g., as determined by a position of a smartwatch worn by the user). For example, the device communication component 225 could transmit one of two instances of audio data to the alarm clock for output, saying either "Great job waking up on time!" or "Let's try to get out of bed faster tomorrow," depending on the data on how many times the user pressed the snooze button and the user's position (e.g., specifying whether the user is still in bed).

Continuing the example, the user could go about her morning routine. Once her network-connected alarm clock detects that the user is out of bed, the device communication component 225 could transmit instructions to a SmartMirror, instructing the electronic device to illuminate, drawing the user's attention to the bathroom. For example, the SmartMirror device could be a device with a mirrored surface that is capable of illuminating and displaying information on the mirrored surface, e.g., using a semi-transparent mirror with a display device behind it. In one embodiment, the SmartMirror device includes computing logic that is configured to control the behavior of the SmartMirror device, e.g., by outputting images for display on the display device. Such a SmartMirror device could also be configured with a network interface (e.g., through which the SmartMirror device can communicate with the device communication component 225) and audio output devices (e.g., speakers) for outputting audio data for playback. As the user splashes her face with water, the game management component 120 could output audio data (e.g., by transmitting instructions to the computing logic within the SmartMirror device and using the audio output devices of the SmartMirror device) representing dialogue that the user with her the morning schedule and news briefing, cracking jokes and providing motivation along the way. For example, the game management component 120 could retrieve text data for the news briefing and jokes, and could process the text data with a text-to-speech module configured to generate audio data in the voice of the fictional character. The generated audio data could then be transmitted to an audio device within the physical environment for output.

Additionally, the game management component 120 could monitor a level of noise within the physical environment by collecting data, via the device communication component 225, from one or more network-connected devices that are configured with microphone sensors. Based on the level of ambient noise, the game management component 120 could adjust the volume at which electronic devices output audio data, to help ensure the user can hear and understand the dialogue. For example, when the user turns on the water full blast, the game management component 120 could output the dialogue in the voice of the fictional character more loudly to compensate. Additionally, the game management component 120 can monitor the user's behavior and dynamically select content for output, based on the user's behavior. For example, the game management component 120 could determine when the user begins brushing her teeth, and could retrieve textual data specifying a dentist joke and could generate audio data by processing the textual data with a text-to-speech module. Upon determining that the user has left the bathroom and has moved towards the front door (e.g., based on the position of the smartwatch worn by the user), the device communication component 225 could transmit instructions to the network-connected front door lock in the user's home, unlocking the door and outputting dialogue wishing the user a great and productive day.

As such, embodiments provide techniques to unify and incentivize the connected device network experience by delivering a continuous, cohesive narrative wrapper around the experience of interacting with the entire network of devices. Embodiments can provide a central hub configured with a game management component 120 that recognizes user input from a variety of connected devices and uses this data input to trigger delivery of further storytelling beats to both reward current activity and encourage further user actions.

Figure 3:
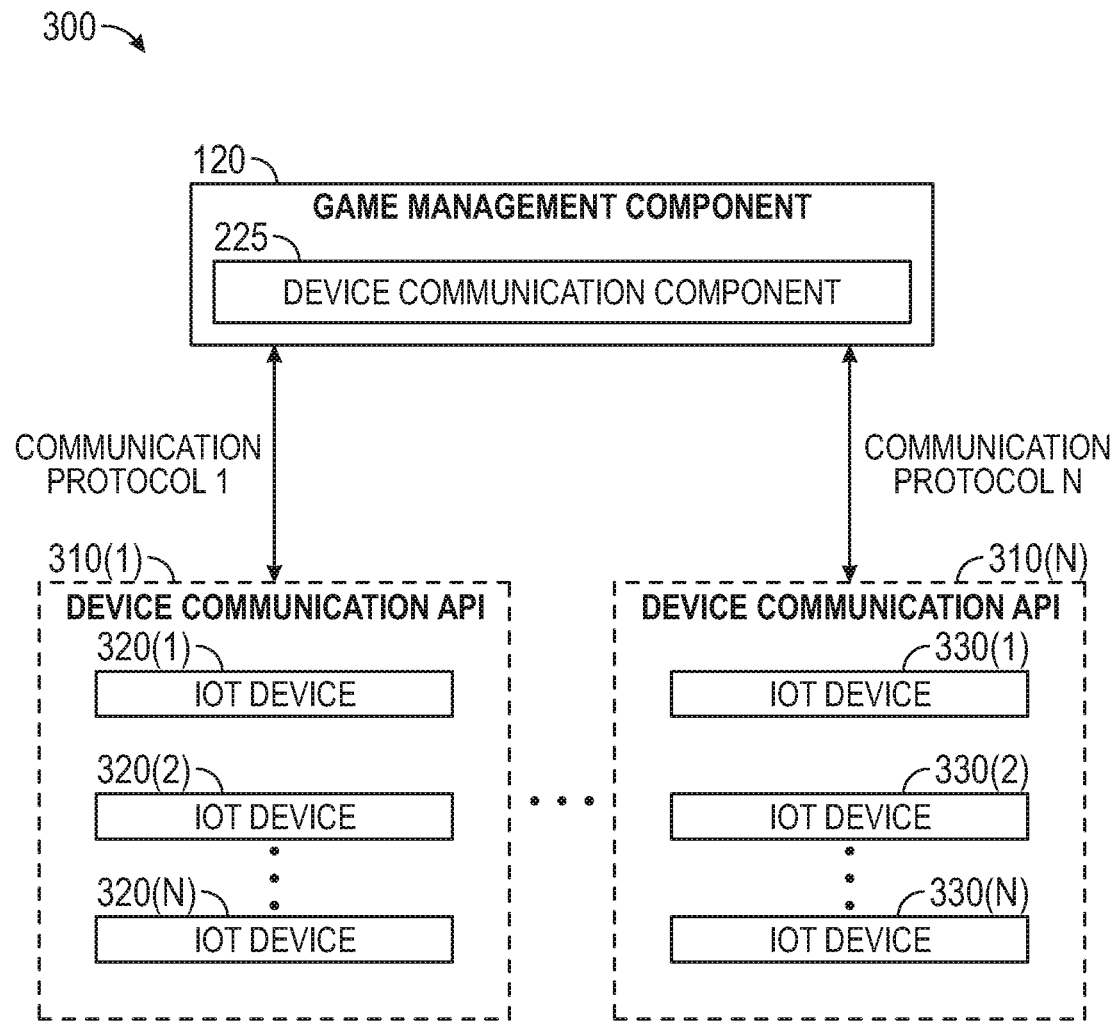
FIG. 3 is a block diagram illustrating a game management component 120 communicating with multiple electronic devices that implement different communication APIs, according to one embodiment described herein.

FIG. 3 is a block diagram illustrating a game management component 120 communicating with multiple electronic devices that implement different communication APIs, according to one embodiment described herein. As shown, the system 300 includes the game management component 120, which is communicating with IOT devices 320(1)-(N) and IOT devices 330(1)-(N). In the depicted example, the IOT devices 320(1)-(N) implement a device communication API 310(1) and the IOT devices 330(1)-(N) implement a device communication API 310(N). Generally, the device communication component 225 can be configured to dynamically determine a type of each of the IOT devices 320(1)-(N) and 330(1)-(N) and, based on this information, the device communication component 225 can determine which device communication API each IOT device implements. For example, the device communication component 225 could identifying a plurality of electronic devices present within a physical environment, by communicating with the plurality of electronic devices over one or more data communications networks (e.g., a WiFi network, a Bluetooth network, etc.). For example, the device communication component 225 could broadcast a message on the network searching for new devices, and the device communication component 225 could determine a device is available within the network upon receiving an acknowledgement message from the device.

The device communication component 225 could then detect, for a first one of the plurality of electronic devices, a respective device type of the first electronic device. For example, the device communication component 225 could transmit a request for device type information to the IOT device 320(1). In one embodiment, all of the IOT devices 320(1)-(N) and 330(1)-(N) are configured to recognize and respond to the same type of message requesting device type information. In a particular embodiment, the device communication component 225 is configured to iterate through a plurality of recognized formats of requests for device type information, in order to determine which format of request is recognized by a particular device.

Upon receiving the device type information, the device communication component 225 determines an API implemented by the first electronic device, based on the detected device type of the first electronic device. For example, the device communication component 225 could determine that the IOT device 320(1) implements the device communication API 310(1), while the IOT device 330(1) implements the device communication API 310(N).

The device communication component 225 could then transmit one or more electronic messages to the first electronic device, via the one or more data communications networks, where the one or more electronic messages are formatted according to the determined API implemented by the first electronic device. For example, the device communication component 225 could transmit a request for device usage data to the IOT device 320(1), where the request is formatted according to the device communication API 310(1).

The game management component 120 could determine to perform one or more game actions for a first user within a virtual world for a first computer game, based on data received from the first electronic device, via the one or more data communications networks. As an example, the game management component 120 could determine that the data received from the first electronic device satisfies one or more conditions as part of a current context of a gameplay mission, and in response, could determine one or more game actions to perform in order to advance the gameplay mission from the current context. As an example, the game management component 120 could retrieve textual data specifying one or more dialogue actions to perform, and could generate audio data by processing the textual data with a text-to-speech module configured to generate audio data in a particular fictional character's voice. The game management component 120 could then output the generated audio data using one of the IOT devices 320(1)-(N) or 330(1)-(N) that is configured with one or more speaker devices. In a particular embodiment, the game management component 120 is configured to select one of the IOT devices 320(1)-(N) and 330(1)-(N) to output the audio, based on device profile information for the devices as well as location information for the devices. In such an embodiment, the game management component 120 can further consider the current location of the user, as determined by data received from another one of the IOT devices 320(1)-(N) and 330(1)-(N). As an example, the game management component 120 could select the device that is configured with one or more speaker devices and that is closest to the user's current location.

The game management component 120 could further update a game state for the first computer game, based on the determined one or more game actions. For example, the game management component 120 could update the context of the gameplay mission, upon successful completion of one or more prerequisite actions by the user. As another example, the achievement management component 130 could grant the user one or more achievements within the gaming environment, as well as any rewards within the gaming environment that correspond to the one or more achievements.

In one embodiment, the game management component 120 is configured to determine a device make-up of the plurality of electronic devices. For example, the game management component 120 could determine a device type of each of the plurality of electronic devices and the game management component 120 could determine which device types are accounted for within the physical environment. The game management component 120 could then determine one or more game dialogue actions to perform, based on the determined device make-up. For example, upon determining that a particular interactive device 145 (e.g., an action figure or stuffed animal for a particular fictional character) is present within the physical environment, the game management component 120 could determine to perform a dialogue action corresponding to the particular fictional character. As another example, upon determining that an IOT toothbrush is present within the fictional environment, the game management component 120 could determine to begin an in-game mission that tasks the user with brushing his teeth using the toothbrush. In doing so, the game management component 120 could identify one or more virtual characters to perform the one or more game dialogue actions. For example, the game management component 120 could determine the user's favorite fictional character, based on user preferences information stored for the user. The game management component 120 could then output a dialogue audio effect announcing this mission to the user (e.g., in the voice of the user's favorite fictional character). In doing so, the game management component 120 could select a text-to-speech module, of a plurality of text-to-speech modules, corresponding to the one or more virtual characters and could perform, using the selected text-to-speech module, the one or more game dialogue actions. Additionally, the game management component 120 could render a plurality of frames in which a depiction of the one or more virtual characters are animated to depict the output of the one or more game dialogue actions.

Continuing the example, the game management component 120 could determine at a subsequent moment in time that the device make-up of the plurality of electronic devices has changed to a second device make-up. For example, an additional electronic device could have become available (e.g., when the user's friend brings the additional electronic device to the user's physical environment, when the additional electric device has been recharged and is again available for use, etc.), which changes the make-up of the electronic devices. The game management component 120 could then determine to perform a second one or more game actions within the virtual world for the first computer game, based on the second device make-up.

As another example, the game management component 120 could determine that the device make-up of the plurality of electronic devices has changed to the second device make-up further comprises determining that a second one of the plurality of electronic devices has become unavailable. As a result, the game management component 120 could re-assigning a second one or more game actions to be performed by a third one of the plurality of electronic devices, rather than the second electronic device, responsive to determining that the second electronic device has become unavailable. For example, the game management component 120 could have initially tasked a first IOT device with outputting audio data as part of a gameplay mission. Upon determining that the first IOT device has become unavailable, the game management component 120 could select another one of the plurality of electronic devices that has a suitable speaker device for outputting the audio data.

In some embodiments, the game management component 120 may be configured to manage separate gameplay missions for multiple users living within the physical environment (e.g., multiple children within a residence). In order to distinguish between various users, the game management component 120 could collect user speech data using one or more microphone devices within the physical environment, and could analyze the user speech data to determine a unique user identifier having a user speech profile that substantially matches the user speech data. The game management component 120 could then select the first user from a plurality of users within the virtual world, based on the unique user identifier. Doing so enables the game management component 120 to distinguish between multiple different users within the physical environment.

As discussed above, the game management component 120 can be configured to retrieve usage data from one of the electronic devices and could analyze this data to determine whether the user has completed various activities (e.g., activities tasked by a particular mission of the gaming environment). For example, the usage data including at least one of a) an indication of duration of device activation, b) an indication of a rate of device activation over time, and c) an indication of a manner of usage of the first electronic device. As an example, the game management component 120 could retrieve such usage data from an IOT toothbrush device and could determine whether the usage data satisfies one or more predefined conditions for interpreting the usage data for the first electronic device. For instance, the game management component 120 could task the user with brushing his teeth for a certain duration, and the game management component 120 could retrieve usage data from the electronic toothbrush device and could analyze this usage data to determine whether the user completed the assigned task. Upon completion of the assigned task, the game management component 120 could advance the context of the gameplay mission and, in some circumstances, could reward the user (e.g., by unlocking achievements, by granting the user virtual items or achievement points, etc.).

In some embodiments, the game management component 120 is configured to dynamically construct a gameplay mission (or story), based on the available electronic devices. For example, the game management component 120 could determine a device make-up of the plurality of electronic devices, the device make-up specifying a plurality of device types for the plurality of electronic devices. The game management component 120 could retrieve a base story template data structure for the first computer game, and could adapt the base story template data structure to create a modified story template data structure, based on the device make-up of the plurality of electronic devices. For instance, a plurality of gameplay actions specified in the modified story template data structure could each be assigned to a respective at least one of the plurality of electronic devices. The game management component 120 could then control the plurality of electronic devices based on the modified story template data structure, by, e.g., transmitting instructions to a second electronic device of the plurality of electronic devices, causing the second electronic device to perform an assigned gameplay action at a determined moment in time.

In a particular embodiment, the game management component 120 can adapt the base story template data structure to create a modified story template data structure is further based on historical user data collected for the first user. Such historical user data can specify, for example, (i) a preferred virtual character within the first computer game, (ii) a preferred type of story to play, (iii) a preferred type of mission to undertake within the first computer game, (iv) previous objectives completed by the first user within the first computer game, and (v) one or more attributes of a first avatar within the first computer game, the first avatar corresponding to the first user.

Figure 4:
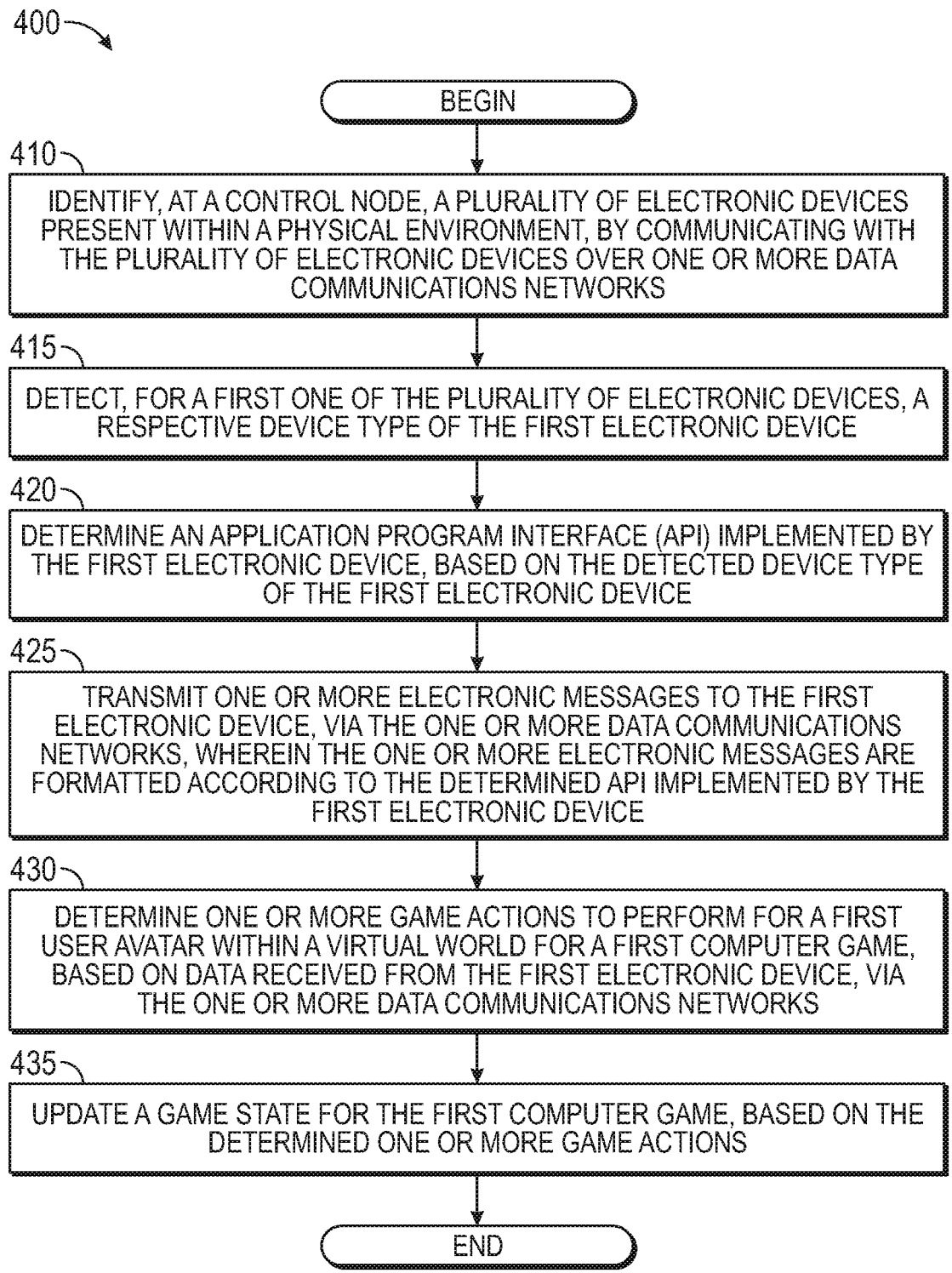
FIG. 4 is a flow diagram illustrating a method for updating game state information based on data received from one or more electronic devices, according to one embodiment described herein.

FIG. 4 is a flow diagram illustrating a method for updating game state information based on data received from one or more electronic devices, according to one embodiment described herein. As shown, the method 400 begins at block 410, where the game management component 120 identifies a plurality of electronic devices present within a physical environment, by communicating with the plurality of electronic devices over one or more data communications networks. The game management component 120 detects, for a first one of the plurality of electronic devices, a respective device type of the first electronic device (block 415). Additionally, it determines an API implemented by the first electronic device, based on the detected device type of the first electronic device (block 420).

The game management component 120 transmits one or more electronic messages to the first electronic device, via the one or more data communications networks (block 420). In one embodiment, the one or more electronic messages are formatted according to the determined API implemented by the first electronic device. The game management component 120 determines to perform one or more game actions for a first user within a virtual world for a first computer game, based on data received from the first electronic device, via the one or more data communications networks (block 430), and updates a game state for the first computer game, based on the determined one or more game actions (block 435), and the method 400 ends.

Figure 5:
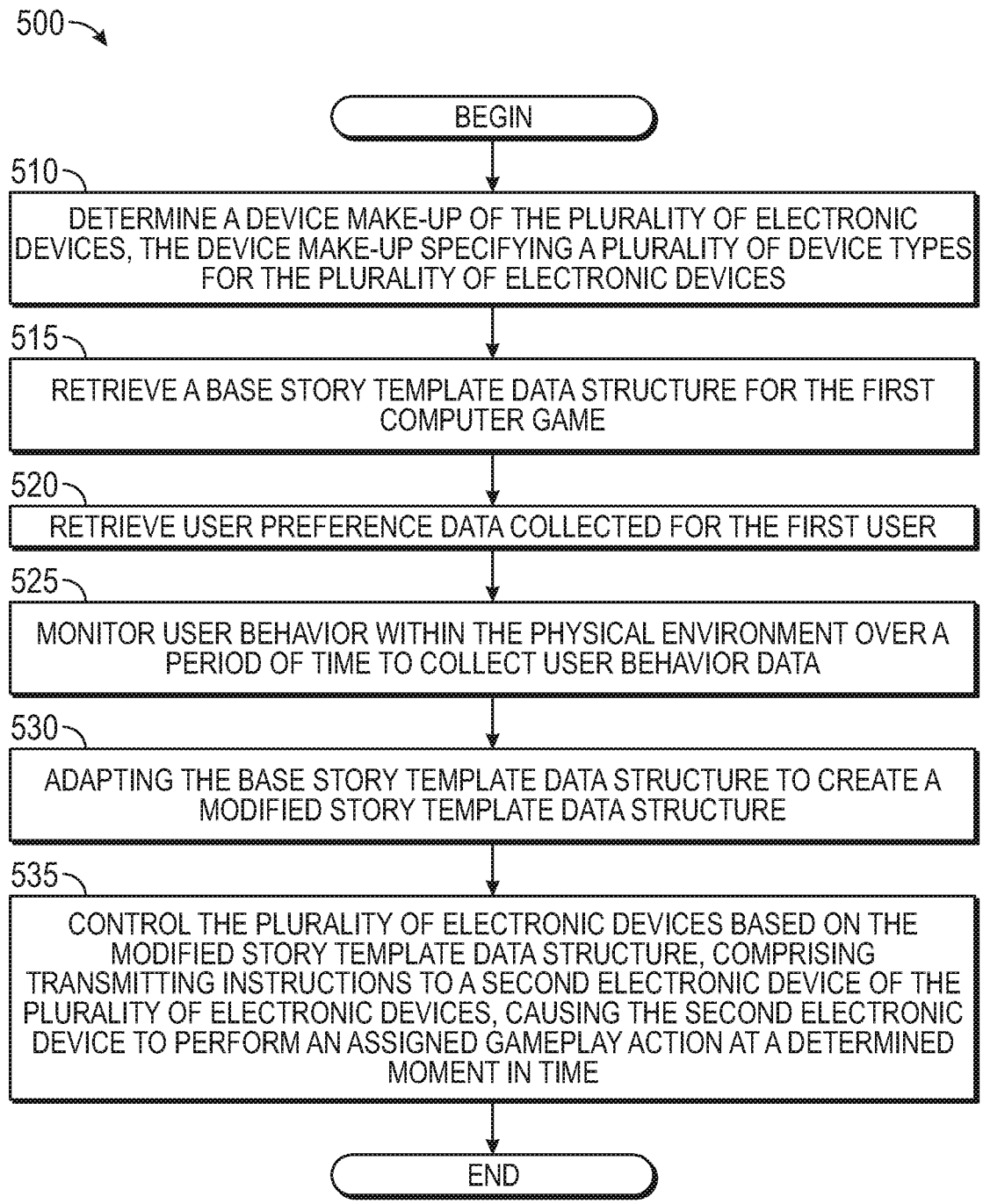
FIG. 5 is a flow diagram illustrating a method for controlling electronic devices, according to one embodiment described herein.

FIG. 5 is a flow diagram illustrating a method for controlling electronic devices, according to one embodiment described herein. As shown, the method 500 begins at block 510, where the game management component 120 determines a device make-up of the plurality of electronic devices. The device make-up specifies a plurality of device types for the plurality of electronic devices. The game management component 120 retrieves a base story template data structure for the first computer game (block 515). For example, the base template may specify a number of device actions to be performed, in response to defined user actions, and which types of devices could be used to perform the device actions.

The game management component 120 retrieves user preference data collected for the first user (block 520). For example, such preference data could be collected by monitoring the user's social media pages (e.g., if the user has liked content corresponding to a particular fictional character), previous purchases (e.g., if the user has purchased films featuring the particular fictional character), and so on. Generally, the game management component 120 can be configured to monitor any data that the user has consented to sharing with the game management component 120.

The game management component 120 can further monitor the user's behavior within the physical environment over a period of time (block 525). For example, the game management component 120 could monitor the user's movement throughout the physical environment and could determine the user's typical daily routine over a window of time. For example, the game management component 120 could determine an approximate time the user wakes up every day, when the user goes to bed each day, when the user leaves the house each day, and so on.

The game management component 120 adapts the base story template data structure to create a modified story template data structure (block 530). In doing so, the game management component 120 can take into account the user preferences, the device make-up and the user's behavior within the physical environment. For example, the game management component 120 could assign game actions within the base story template to available electronic devices within the physical environment. Moreover, the game management component 120 could retrieve text-to-speech modules corresponding to one or more preferred fictional characters of the user, for use in generating audio data representing dialogue in the voice of the fictional character as part of a gameplay mission. The game management component 120 then controls the electronic devices based on the modified story template data structure, by transmitting control instructions to the various electronic devices (block 535), and the method 500 ends.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present disclosure may be provided to end users through a cloud computing infrastructure.

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a game management component 120 could execute within the cloud computing environment, and could receive data from a control hub located with a user's physical environment. The game management component 120 could detect a respective device type of a first electronic device, could determine an API implemented by the first electronic device, based on the detected device type of the first electronic device, and could transmitting one or more electronic messages to the first electronic device, via the one or more data communications networks, the one or more electronic messages formatted according to the determined API implemented by the first electronic device. For example, the game management component 120 in the cloud computing environment could forward the electronic messages to the control hub within the user's physical environment (e.g., over the Internet), which could in turn forward the electronic messages on to the first electronic device (e.g., over a Bluetooth network). Additionally, the game management component 120 could determine to perform one or more game actions for a first user within a virtual world for a first computer game, based on data received from the first electronic device, and could update a game state for the first computer game, based on the determined one or more game actions. Doing so allows a user to take advantage of this functionality from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
identifying, at a control node, a plurality of electronic devices present within a physical environment, by communicating with the plurality of electronic devices over one or more data communications networks;
detecting, for a first one of the plurality of electronic devices, a respective device type of the first electronic device;
determining an Application Program Interface (API) implemented by the first electronic device, based on the detected device type of the first electronic device;
transmitting one or more electronic messages to the first electronic device, via the one or more data communications networks, wherein the one or more electronic messages are formatted according to the determined API implemented by the first electronic device;
determining to perform one or more actions for a first user for a first computer game, based on data received from the first electronic device via the one or more data communications networks, including determining to grant, to the first user, one or more achievement points usable to unlock virtual content within the first computer game; and
updating a game state for the first computer game, based on the determined one or more actions.

2. The method of claim 1, wherein the game state further comprises a data structure describing a persistent state of a first avatar within a virtual world, the first avatar corresponding to the first user.

3. The method of claim 1, wherein determining to perform the one or more actions for a first user for the first computer game further comprises:
determining, based on a device make-up of the plurality of electronic devices, one or more game dialogue actions to perform;
identifying one or more virtual characters within a virtual world to perform the one or more game dialogue actions;
selecting a text-to-speech module, of a plurality of text-to-speech modules, corresponding to the one or more virtual characters;
performing, using the selected text-to-speech module, the one or more game dialogue actions; and
rendering a plurality of frames in which a depiction of the one or more virtual characters are animated to depict the output of the one or more game dialogue actions.

4. The method of claim 3, further comprising:
determining that the device make-up of the plurality of electronic devices has changed to a second device make-up; and
determining to perform a second one or more actions for a first avatar within the virtual world for the first computer game, based on the second device make-up, the first avatar corresponding to the first user.

5. The method of claim 4, wherein determining that the device make-up of the plurality of electronic devices has changed to the second device make-up further comprises determining that an additional electronic device has become present within the physical environment, based on data communications with the additional electronic device over the one or more data communications networks.

6. The method of claim 5, further comprising:
assigning a second one or more actions to be performed by the additional electronic device.

7. The method of claim 4, wherein determining that the device make-up of the plurality of electronic devices has changed to the second device make-up further comprises determining that a second one of the plurality of electronic devices has become unavailable.

8. The method of claim 7, further comprising:
re-assigning a second one or more actions to be performed by a third one of the plurality of electronic devices, rather than the second electronic device, responsive to determining that the second electronic device has become unavailable.

9. The method of claim 1, further comprising:
collecting user speech data using one or more microphone devices within the physical environment;
analyzing the user speech data to determine a unique user identifier having a user speech profile that substantially matches the user speech data; and
selecting the first user from a plurality of users within a virtual world, based on the unique user identifier.

10. The method of claim 1, wherein determining to perform the one or more actions for the first user, based on the data received from the first electronic device, further comprises:
receiving usage data from the first electronic device, the usage data including at least one of a) an indication of duration of device activation, b) an indication of a rate of device activation over time, and c) an indication of a manner of usage of the first electronic device;
determining one or more predefined conditions for interpreting the usage data for the first electronic device, wherein the one or more predefined conditions have a predefined relationship with the one or more actions; and
determining to perform the one or more actions for the first user, responsive to determining that the one or more predefined conditions are satisfied by the usage data.

11. The method of claim 10, wherein the first electronic device further comprises an electronic toothbrush, wherein the usage data specifies a measure of rotations per minute (RPM) and a duration of usage.

12. The method of claim 1, wherein detecting the respective device type of the first electronic device further comprises:
receiving data from the first electronic device over the one or more data communications network, the data specifying identification information for the first electronic device;
querying a remote server using the identification information for the first electronic device; and
in response, receiving an indication of the device type of the first electronic device from the remote server.

13. The method of claim 1, wherein the one or more electronic messages transmitted to the first electronic device, via the one or more data communications networks, specify a request for a first type of data from the first electronic device.

14. The method of claim 1, wherein the one or more electronic messages transmitted to the first electronic device, via the one or more data communications networks, specify one or more instructions configured to cause the first electronic device to perform a specified action.

15. The method of claim 1, further comprising:
determining a device make-up of the plurality of electronic devices, the device make-up specifying a plurality of device types for the plurality of electronic devices;
retrieving a base story template data structure for the first computer game;
adapting the base story template data structure to create a modified story template data structure, based on the device make-up of the plurality of electronic devices, wherein a plurality of gameplay actions specified in the modified story template data structure are each assigned to a respective at least one of the plurality of electronic devices; and
controlling the plurality of electronic devices based on the modified story template data structure, comprising transmitting instructions to a second electronic device of the plurality of electronic devices, causing the second electronic device to perform an assigned gameplay action at a determined moment in time.

16. The method of claim 15, wherein adapting the base story template data structure to create a modified story template data structure is further based on historical user data collected for the first user, wherein the historical user data specifies at least one of (i) a preferred virtual character within the first computer game, (ii) a preferred type of story to play, (iii) a preferred type of mission to undertake within the first computer game, (iv) previous objectives completed by the first user within the first computer game, and (v) one or more attributes of a first avatar within the first computer game, the first avatar corresponding to the first user.

17. The method of claim 16, further comprising:
monitoring user behavior within the physical environment over a period of time to collect user behavior data,
wherein adapting the base story template data structure to create a modified story template data structure is further based on the collected user behavior data.

18. A non-transitory computer-readable medium containing computer program code that, when executed by operation of one or more computer processors, performs an operation comprising:
identifying, at a control node, a plurality of electronic devices present within a physical environment, by communicating with the plurality of electronic devices over one or more data communications networks;
detecting, for a first one of the plurality of electronic devices, a respective device type of the first electronic device;
determining an Application Program Interface (API) implemented by the first electronic device, based on the detected device type of the first electronic device;
transmitting one or more electronic messages to the first electronic device, via the one or more data communications networks, wherein the one or more electronic messages are formatted according to the determined API implemented by the first electronic device;
determining to perform one or more actions for a first user for a first computer game, based on data received from the first electronic device via the one or more data communications networks, including determining to grant, to the first user, one or more achievement points usable to unlock virtual content within the first computer game; and
updating a game state for the first computer game, based on the determined one or more actions.

19. A system, comprising:
one or more computer processors;
one or more network interfaces; and
a memory containing computer program code that, when executed by operation of the one or more computer processors, performs an operation comprising:
- identifying, at a control node, a plurality of electronic devices present within a physical environment, by communicating with the plurality of electronic devices over one or more data communications networks using the one or more network interfaces;
- detecting, for a first one of the plurality of electronic devices, a respective device type of the first electronic device;
- determining an Application Program Interface (API) implemented by the first electronic device, based on the detected device type of the first electronic device;
- transmitting one or more electronic messages to the first electronic device, via the one or more data communications networks, wherein the one or more electronic messages are formatted according to the determined API implemented by the first electronic device;
- determining to perform one or more actions for a first user for a first computer game, based on data received from the first electronic device via the one or more data communications networks, including determining to grant, to the first user, one or more achievement points usable to unlock virtual content within the first computer game; and
- updating a game state for the first computer game, based on the determined one or more actions.

20. The system of claim 19, wherein the game state further comprises a data structure describing a persistent state of a first avatar within a virtual world, the first avatar corresponding to the first user.

* * * * *